United States Patent [19]

King

[11] 4,079,618

[45] Mar. 21, 1978

[54] DRY WELL FOR TEMPERATURE CALIBRATION SYSTEM

[75] Inventor: James Robert King, Woodland Hills, Calif.

[73] Assignee: King Nutronics Corporation, Woodland Hills, Calif.

[21] Appl. No.: 765,731

[22] Filed: Feb. 4, 1977

[51] Int. Cl.² .............................................. G01K 15/00
[52] U.S. Cl. ............................................. 73/1 F; 62/3
[58] Field of Search ................................ 73/1 F; 62/3

[56] References Cited

U.S. PATENT DOCUMENTS

| | | | |
|---|---|---|---|
| 3,309,881 | 3/1967 | Beerman | 73/1 F |
| 3,402,561 | 9/1968 | Mahoney | 62/3 |
| 3,480,015 | 11/1969 | Gonzalez | 62/3 |
| 3,499,294 | 3/1970 | Barton et al. | 62/3 |

*Primary Examiner*—S. Clement Swisher

*Attorney, Agent, or Firm*—Harris, Kern, Wallen & Tinsley

[57] ABSTRACT

A system for calibration of a temperature probe at temperatures both above and below ambient. A dry type heatsink for receiving the temperature probe, with a plurality of thermo-electric modules for selectively heating and cooling the heatsink to a preset temperature. A control circuit with a bridge arm for the desired or set temperature and a bridge arm for the actual or sensed temperature, providing inputs to a comparator for determining deviation from the set temperature and energizing the modules to change the temperature at the heatsink. A display unit for selectively displaying the actual temperature and the set temperature and for use in calibrating the system. A constant current source for the sensing arm of the bridge for improving the accuracy of the sensed temperature.

5 Claims, 5 Drawing Figures

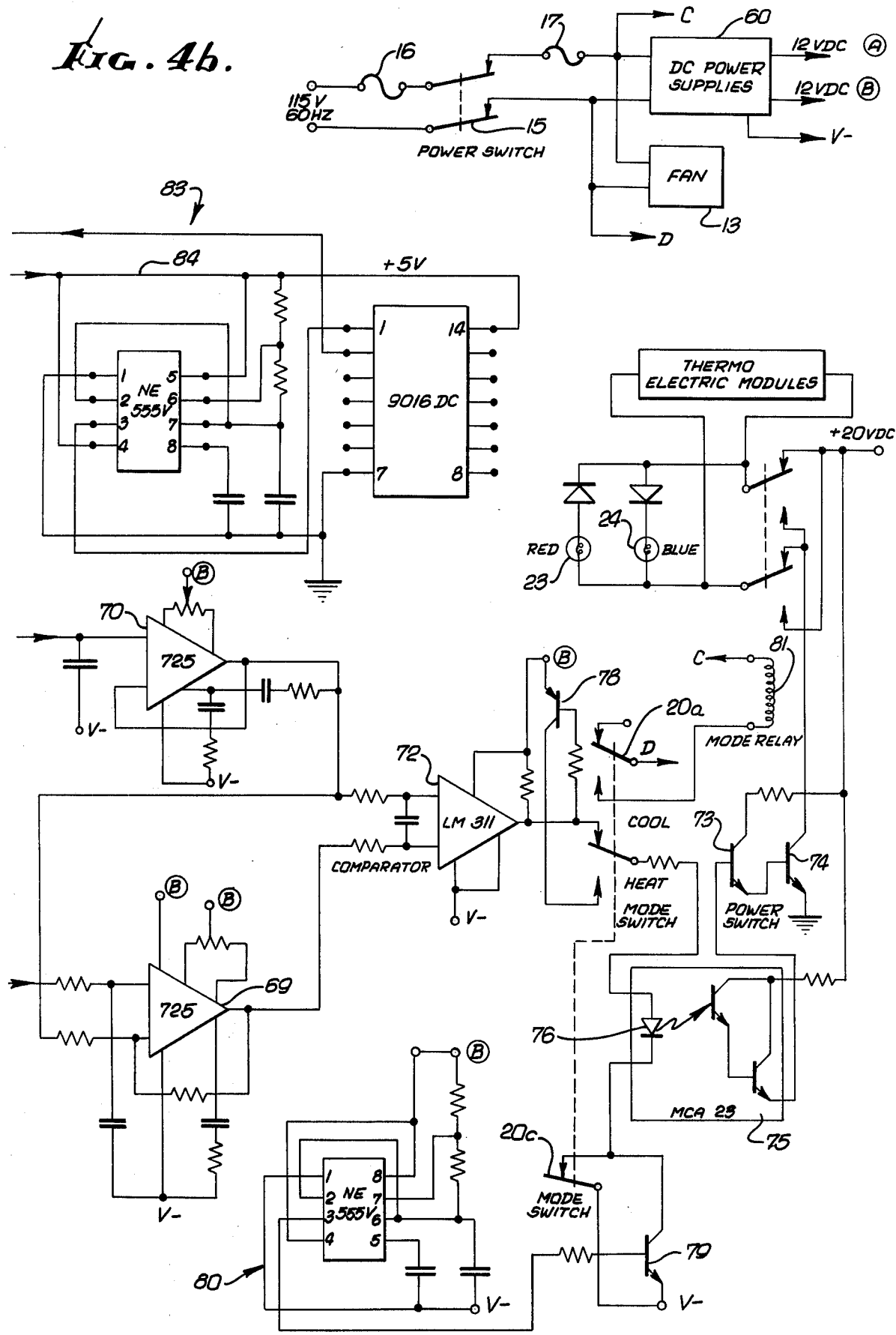

DRY WELL FOR TEMPERATURE CALIBRATION SYSTEM

BACKGROUND OF THE INVENTION

This invention relates to dry well temperature test systems and to systems particularly designed to be portable for easy use on site in testing and calibration of various temperature sensing devices, such as thermocouples, thermo-switches, thermistors, thermometers, temperature control systems, and temperature indicators. Several prior art systems are shown in U.S. Pat. Nos. 3,699,800; 3,738,174; and 3,939,687.

The prior art devices include an electrically heated, dry temperature well for receiving the probe or other temperature sensing device which is to be tested or calibrated. The devices also include some means for setting the desired temperature, a control circuit for controlling the input to the well to obtain the desired temperature, and some means for indicating that the desired temperature has been obtained. However, these prior art devices have operated only at elevated temperatures, that is at temperatures higher than ambient. It is an object of the present invention to provide a new and improved temperature calibration system which can operate at temperatures below ambient as well as above ambient, that is, to provide a system that can produce cooling to a predetermined temperature as well as heating to a predetermined temperature. One embodiment of the present invention is operable over the range of minus 40° F to plus 250° F. Other objects, advantages, features and results will more fully appear in the course of the following description.

SUMMARY OF THE INVENTION

The preferred embodiment of the temperature calibration system includes a first heatsink with an opening for receiving the temperature probe, and having a temperature sensing resistor mounted therein. Heating and cooling is provided by a plurality of thermo-electric modules mounted between the first heatsink and a second heatsink, with a second heatsink exposed to the ambient atmosphere, preferably incorporating radiating fins, with a fan for moving air past the fins. A control circuit provides for selectively connecting the modules to an electric power source with one plurality for heating and with the opposite polarity for cooling.

In the preferred embodiment, the modules are in two groups, with one group between the first heatsink and a third heatsink and with the other group between the third heatsink and the second heatsink. The modules are electrically connected in series, with the one group connected intermediate the other group for improved heat control.

BRIEF DESCRIPTION OF THE DRAWINGS

FIGS. 4a and 4b are an electrical schematic of the instrument of FIG. 1.

DESCRIPTION OF THE PREFERRED EMBODIMENT

Figure 1:
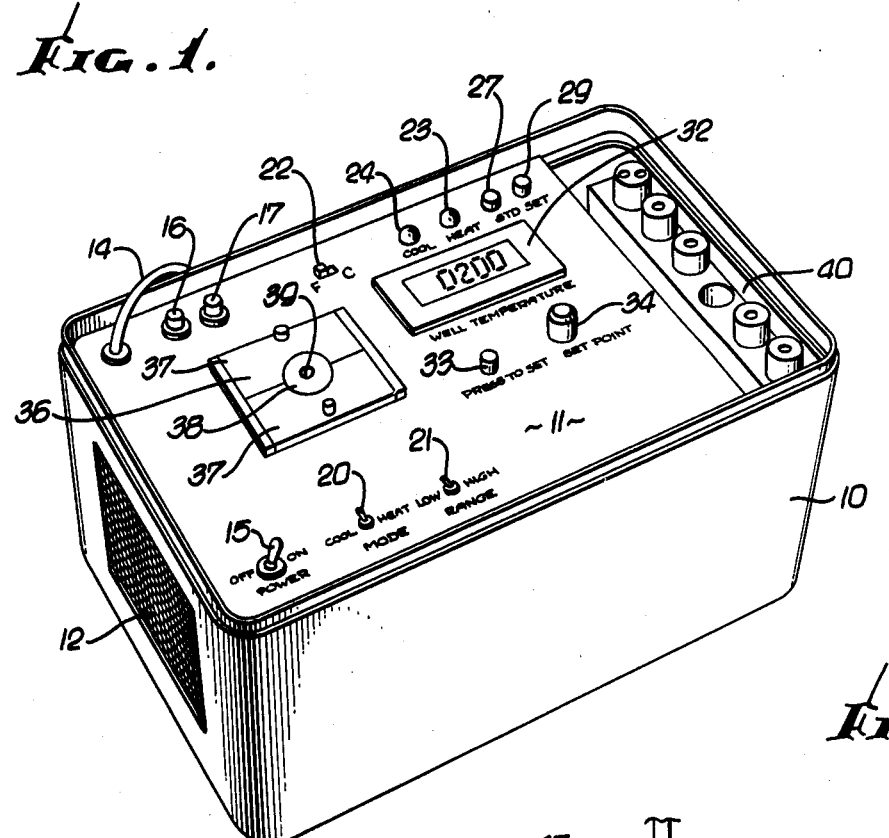
FIG. 1 is a perspective view of a portable dry well temperature test system incorporating the presently preferred embodiment of the invention.

The instrument shown in FIG. 1 includes a housing 10 with the cover removed. A panel 11 is carried within the housing and supports the components of the system within the housing. A screen 12 is mounted in one wall of the housing 10 to provide for air flow through the interior, preferably provided by a motor driven fan 13 (FIG. 4b).

Figure 4A:
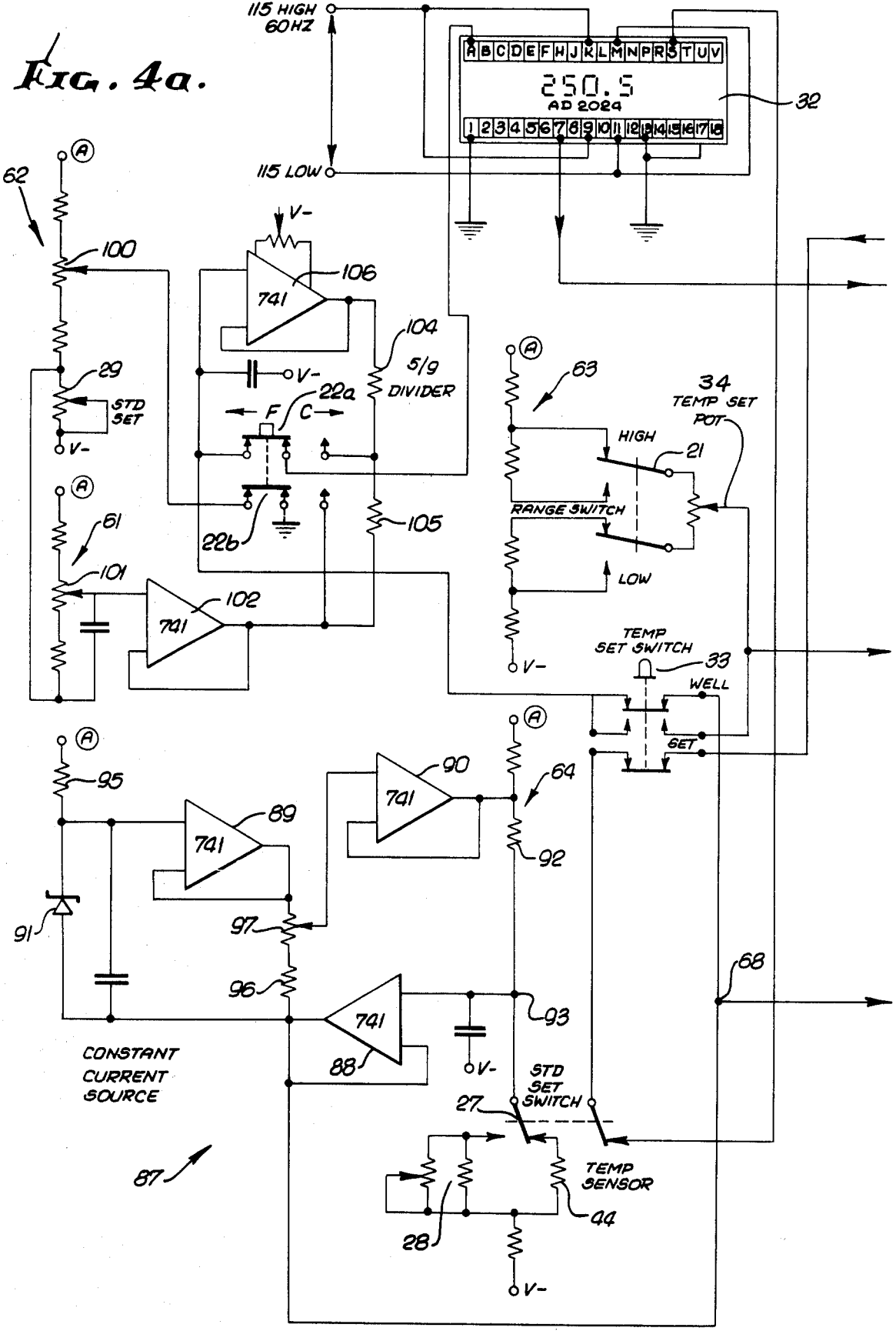

The various controls for the system are mounted on the panel 11. 115 volt 60 hertz ac power is provided via a cord 14 and controlled by an on-off switch 15. Fuses 16, 17 are connected in the power supply circuitry (FIG. 4b). A mode switch 20 provides for selection of the heating or cooling mode. A range switch 21 selects operation in the high range or low range. A slide switch 22 provides for selection of Farenheit (F) or Centigrade (C) operation. This switch has two sections identified as 22a and 22b on FIG. 4a. A red light 23 is energized when the system is in the heating mode and a blue light 24 is energized when the system is in the cooling mode. A standard set switch 27 switches a standard resistor 28 into the circuit when the switch is depressed. In FIG. 4a, a fixed resistor and a variable resistor connected in parallel are used as the standard resistor. A standard set potentiometer 29 is connected as a variable resistor.

A temperature indicator 32, typically a conventional digital readout unit, provides an indication of temperature in degrees and tenths of degrees. A temperature set switch 33 and a temperature set potentiometer 34 provide for setting the desired temperature, as will be described hereinbelow.

A temperature well 36 is also mounted in the panel, and may have a cover of the type shown in the aforementioned U.S. Pat. No. 3,738,174. Hinged cover members 37 may be opened for insertion and removal of a metal sleeve 38. The sleeve 38 is one of several provided with the instrument, with each sleeve having an opening 39 for insertion and removal of the temperature probe or other item which is to be tested or calibrated. Other sleeves are carried in the rack 40, with each sleeve having a different shape, size and/or number of openings.

Figure 2:
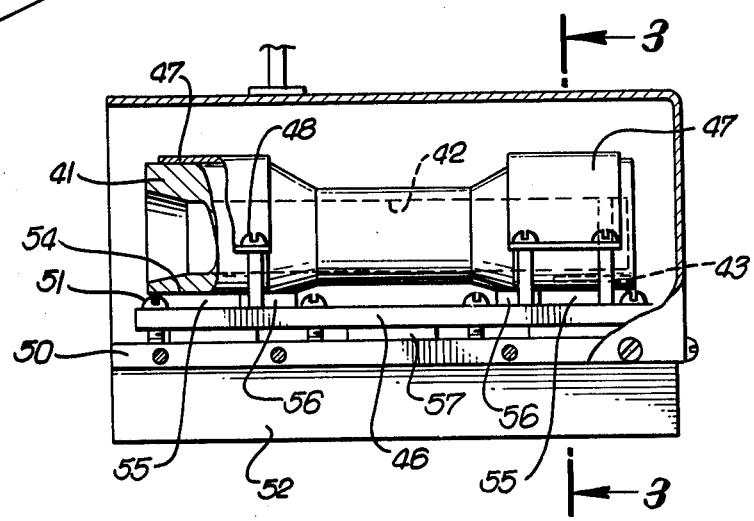
FIG. 2 is a side view, partly in section, showing the heatsink and thermo-electric module installation in the instrument of FIG. 1.
Figure 3:
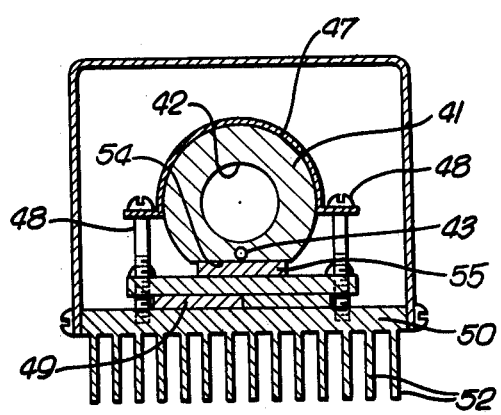
FIG. 3 is a sectional view taken along the line 3—3 of FIG. 2.

The sleeve are close sliding fits in a heatsink 41 which is shown in greater detail in FIGS. 2 and 3. The sleeves and the heatsink are made of metal, typically copper or aluminum. The heatsink 41 has an opening 42 for receiving the sleeve, and a small opening 43 for receiving a temperature sensing resistor 44. In the preferred embodiment illustrated the heatsink 41 is an elongate unit, generally cylindrical, with a larger mass at each end and a smaller mass intermediate the ends, and with coplanar faces 54 at the ends.

Heating and cooling of the heatsink 41 is achieved by a plurality of thermo-electric modules, preferably used in two groups in two stages. Two modules 55, 56 are mounted at each face 54 between the heatsink 41 and a metal plate 46 by means of straps 47 and screws 48. Ten additional modules 49 are mounted between the plate 46 and another heatsink 50 by means of screws 51. The heatsink 50 preferably has a plurality of radiating fins 52. A cover 53 is provided over the heatsink 41 for protecting the heatsink 40 from the ambient air, particularly that being moved by the fan 13 over the radiating fins 52. The modules may be Borg-Warner P/N940.

The modules are connected together electrically with the same polarity, preferably in series. When it is desired to raise the temperature of the heatsink 41 above ambient, the group of modules is connected to a dc power source with one polarity, and when it is desired to lower the temperature of the heatsink below ambient, the group of modules is connected to the source with the opposite polarity. The plate 46 serves as an intermediate heatsink between the modules 55, 56 and the modules 49, providing a desired uniformity of heat transfer. The modules 55 and 49 preferably are full size 940-31 and the modules 56 half size 940-15, providing optimum engagement with the heatsink 41. The 10 modules between the heatsink 50 and the plate 46, which also serves as a heatsink, preferably are positioned in pairs side by side in a 2 × 5 matrix. One of the intermediate modules, such as the module 57, preferably is a 940-31-OT having an open conductor path with the modules 55, 56 connected in this open path, to provide the series connection for all the modules. The arrangement reduces the temperature differential across the wires used for connection because the top plate of module 57 is at substantially the same temperature as the bottom plates of the modules 55, 56.

Turning to the electric circuitry of FIGS. 4a and 4b, conventional dc power supplies 60 provide two dc outputs A and B, both having a common negative V−. The A supply is connected across bridge arms 61, 62, 63 and 64. Bridge arms 61 and 62 provide a reference point for the digital display 32, with the switch 22 selecting arm 62 for Farenheit operation and arm 61 for Centigrade operation. The temperature sensing resistor 44 is connected in bridge arm 64 when the standard set switch 27 is in the normal position. The output from bridge arm 64 at point 68 is connected as an input to an operational amplifier 69 which preferably is designed to have a gain of one thousand. When the set switch 27 is depressed, the standard resistor 28 is inserted in place of the temperature sensing resistor 44.

The moving arm of the temperature set potentiometer 34 in the bridge arm 63 is connected as an input to another operational amplifier 70 which preferably is operated as a follower. The range switch 21 is a two position switch which selects different resistors in the bridge arm 63 to yield better potentiometer resolution over the entire range of the unit. When the desired temperature is near the extremes of the operating range of the system, the switch 21 is placed in the high range condition while when the desired temperature is near the ambient, the switch is placed in the low condition.

The outputs of the amplifiers 69, 70 are connected as inputs to a comparator 72, which in turn controls power switching transistors 73, 74, preferably via a Darlington LED-transistor combination unit 75. With mode switch 20 in the cool mode, the output of the comparator 72 is directly connected through arm 20b of the mode switch to the LED 76 and through arm 20c of the mode switch to V−. When the mode switch is in the heat position, the output of the comparator 72 is connected through a circuit with transistor 78 which reverses the comparator output. Also, the switch arm 20c is now in the open circuit position, placing transistor 79 in circuit with the LED 76. The transistor 79 is controlled by a timer circuit 80 which pulses the transistor 79 into conduction and out of conduction, typically at about four pulses per second with a 50% duty cycle. The purpose of the timer circuit is to reduce the amount of heating produced by the modules when in the heating mode. Also when in the heating mode, arm 20a of the mode switch connects the coil of mode relay 81 to the 115 volt supply to energize the relay and reverse the polarity of the 20 volts dc connected to the thermo-electric modules.

The readout unit 32 preferably is a standard digital panel meter with LED numerals with a sensitivity of 1 millivolt per degree. The normal input for the meter is from the output of the temperature sensing bridge arm 64 at point 68 through the temperature set switch 33 and the F-C switch 22a. When switch 33 is in the normal well mode, the display unit 32 indicates the actual temperature of the heatsink 41. A meter hold timer or scan circuit 83 receives power from the meter unit via line 84 and provides an output to the meter unit through the temperature set switch 33 and the standard set switch 27. This circuit introduces a time lag in the operation of the display unit 32 so that it will not follow short duration transients of less than one-half second duration. This scan circuit 83 may be conventional in design and operation.

When either the temperature set switch 33 or the standard set switch 27 is moved to the set position, the scan circuit 83 is disconnected from the display unit 32. When the temperature set switch 33 is depressed, the output of the temperature set arm 63 is connected as the input to the display unit, so that the operator may adjust the temperature set potentiometer 34 to the desired temperature which is indicated at the meter 32.

The temperature sensor resistor 44 typically is a copper resistance element which has an extremely linear resistance-temperature characteristic. This linearity may be further improved by utilizing a constant current source 87 to maintain a constant current through the resistor 44, typically in the order of a few milliamperes.

The preferred embodiment of the constant current source 87 illustrated in FIG. 4a includes buffer amplifiers 88, 89 and 90, and a precision voltage reference diode 91. The diode 91 is connected across resistor 92 of bridge arm 64 by the buffer amplifiers, and the circuit functions to maintain the voltage across the resistor 92 constant, even though the total resistance of bridge arm 64 changes. The base of the diode 91 is connected to point 93 of bridge arm 64 through buffer amplifier 88, and follows the voltage at point 93. The other terminal of the diode 91 is connected to power supply terminal A through a resistor 95, and as a input to the amplifier 89. The input to amplifier 89 is held at the reference value of the diode 91 with respect to the point 93. In the particular embodiment illustrated, a 6.4 volt diode is utilized. Resistor 96 and potentiometer 97 are connected as a voltage divider to provide an adjustment for the circuit, with the arm of potentiometer 97 providing an input to the amplifier 90. Amplifier 90 presents a high impedance to the diode 91 and hence the diode operation is not affected by the characteristics of the resistors 96, 97. Amplifier 88 presents a very high input resistance to the bridge arm 64 and hence does not affect the bridge arm.

The voltage to be maintained across the resistor 92 is readily calculated for any specific circuit, and the potentiometer 97 may be adjusted to provide this precise voltage. The circuit disclosed will maintain this voltage across the resistor and therefore the current through the resistor will be maintained constant so that the temperature sensing resistor 44 operates with a constant current.

The Farenheit bridge arm 62 includes a potentiometer 100 and the Centigrade bridge arm 61 includes a similar potentiometer 101, which potentiometers are used for calibrating the display unit 32. The power supplies 60 are floating with respect to circuit ground and are connected to ground only through the F-C switch section 22b. The reference input terminal 1 of the temperature display unit 32 is also connected to circuit ground so that adjustment of the potentiometer 100 and the potentiometer 101 provides adjustment of the reference input to the display unit. In the embodiment illustrated, a buffer amplifier 102 is connected in the output of the potentiometer 101. If desired, a similar buffer amplifier can be used in the output of the potentiometer 100. Resistors 104, 105 are connected as a 5/9 divider in the F-C switch circuit for changing the meter input signal magnitude for Farenheit and Centigrade indications. Another buffer amplifier 106 is connected in the input to the 5/9 divider circuit.

In operation, the appropriate sleeve 38 for the component to be tested, is selected and placed in the heatsink 41. The test temperature is selected by the operator who can make the selection of Farenheit or Centigrade, heat or cool mode, and high or low range, and then actuate the power switch to turn on the system. The system may be set by pressing the standard set switch 27 and adjusting the standard set potentiometer 29 to provide the predetermined indication at the display unit 32. In the instrument illustrated, the standard set point is 77.0° F or the equivalent in degrees C.

The operator then presses the temperature set switch 33 and adjusts the temperature set potentiometer 34 to obtain the desired temperature indication at the diplay 32. The device to be calibrated is inserted into the opening of the sleeve and the system automatically brings the heatsink to the previously set temperature. When in the heating mode, the comparator 72 will provide an output for energizing the power switch whenever the output from the amplifier 69 differs from the output from the amplifier 70 in a direction indicating that the actual temperature is lower than the set temperature. This provdes dc power of one polarity to the modules and adds heat to the heatsink 41. Similarly when in the cool mode, the comparator 72 provides an output to the power switch when the output of the amplifier 69 differs from that of the amplifier 70 in the direction indicating that the actual temperature of the heatsink is higher than the set temperature. DC power of the opposite polarity is connected across the modules and heat is withdrawn from the heatsink 41.

The instrument as illustrated will automatically maintain the actual temperature within about ½° Farenheit of the set temperature and will stabilize at the set temperature in about 15 minutes to 1 hour, depending upon the difference between the set temperature and ambient.

I claim:

1. In a system for calibration of a temperature probe, the combination of:
   a first heatsink with an opening for receiving the temperature probe;
   a plurality of thermo-electric modules, each module serving as a heat source and a heatsink depending on the polarity of the applied voltage, with said plurality of modules divided into first and second groups;
   a second heatsink;
   a third heatsink;
   means for mounting said first group of modules between said first an third heatsinks and said second group of modules between said third and second heatsinks; and
   a control circuit for selectively connecting said modules to an electric power source with one polarity and with the opposite polarity;
   with said modules electrically connected in series, and with the modules of said second group disposed in pairs side by side, with one module of an intermediate pair having an open electrical conduction path with the modules of said first group connected therein.

2. In a system for calibration of a temperature probe, the combination of:
   a first heatsink with an opening for receiving the temperature probe;
   a plurality of thermo-electric modules, each module serving as a heat source and a heatsink depending on the polarity of the applied voltage, with said plurality of modules divided into first and second groups;
   a second heatsink;
   a third heatsink;
   means for mounting said first group of modules between said first and third heatsinks and said second group of modules between said third and second heatsinks; and
   a control circuit for selectively connecting said modules to an electric power source with one polarity and with the opposite polarity;
   said first heatsink being an elongate unit with a larger mass at each end and a smaller mass intermediate the ends, and having coplanar surfaces at each end in engagement with modules of said first group.

3. A system as defined in claim 2 wherein said first group includes full and half-size modules, with a full and a half-size module at each of said coplanar surfaces.

4. A system as defined in claim 2 wherein said modules are electrically connected in series.

5. A system as defined in claim 4 wherein the modules of said second group are disposed in pairs side by side, with one module of an intermediate pair having an open electrical conduction path with the modules of said first group connected therein.

* * * * *